(12) United States Patent
Zhao

(10) Patent No.: US 9,306,480 B2
(45) Date of Patent: Apr. 5, 2016

(54) METHOD FOR CONTROLLING ECM MOTOR TO OUTPUT CONSTANT TORQUE

(71) Applicant: ZHONGSHAN BROAD-OCEAN MOTOR CO., LTD., Zhongshan (CN)

(72) Inventor: Yong Zhao, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 95 days.

(21) Appl. No.: 14/331,190

(22) Filed: Jul. 14, 2014

(65) Prior Publication Data
US 2015/0115851 A1   Apr. 30, 2015

(30) Foreign Application Priority Data
Oct. 28, 2013   (CN) .......................... 2013 1 0518422

(51) Int. Cl.
  $H02P\ 6/06$   (2006.01)
  $H02P\ 1/04$   (2006.01)
  $H02P\ 6/08$   (2006.01)
  $H02P\ 27/08$  (2006.01)
  $H02P\ 6/18$   (2006.01)

(52) U.S. Cl.
  CPC  *H02P 6/08* (2013.01); *H02P 27/08* (2013.01); *H02P 6/182* (2013.01)

(58) Field of Classification Search
  CPC ............ H02P 6/08; H02P 27/08; H02P 6/182
  USPC .................................. 318/400.06, 400.09, 503
  See application file for complete search history.

(56) References Cited

U.S. PATENT DOCUMENTS

2012/0126730 A1* 5/2012 Dornhof ................. H02P 6/182
                                                      318/400.06

* cited by examiner

*Primary Examiner* — Bentsu Ro
*Assistant Examiner* — Zemenay Truneh
(74) *Attorney, Agent, or Firm* — Matthias Scholl, PC; Matthias Scholl

(57) ABSTRACT

A method for controlling an ECM motor to output a constant torque. The method includes: 1) entering a target torque value T0 from an external device; when the motor is in a non-use state, starting the motor, and allowing the microprocessor to acquire an original output voltage value P chopped by a PWM signal; when the motor is in a running state, allowing the microprocessor to acquire a current output voltage value P chopped by the PWM signal; 2) enabling the microprocessor to calculate a target bus current value Itad using the function Itad=F(T,P) according to the target torque value T0 and the output voltage value P chopped by the PWM signal; and detecting a real-time bus current Ibus; and 3) allowing the microprocessor to compare the target bus current value Itad with the real-time bus current Ibus for conducting a closed-loop control.

4 Claims, 7 Drawing Sheets

METHOD FOR CONTROLLING ECM MOTOR TO OUTPUT CONSTANT TORQUE

CROSS-REFERENCE TO RELATED APPLICATIONS

Pursuant to 35 U.S.C. §119 and the Paris Convention Treaty, this application claims the benefit of Chinese Patent Application No. 201310518422.3 filed Oct. 28, 2013, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to a method for controlling an ECM motor to output a constant torque.

2. Description of the Related Art

Electronically commutated motors (ECM) or DC brushless permanent magnet synchronous motors generally have three control modes including a constant rotational speed control mode, a constant torque control mode, and a constant air volume control mode, of which, the constant torque control mode is commonly used. A currently used vector control mode has complicate mathematical model, troublesome operation, high demands on the arithmetic capability of a central processing unit (CPU), thereby resulting in high production costs. A typical constant torque control mode is conducted by scale control of the bus current; however, such a control mode is complicated and has a plurality of variables thereby resulting in poor control accuracy.

SUMMARY OF THE INVENTION

In view of the above-described problems, it is one objective of the invention to provide a method for controlling an ECM motor to output a constant torque. The method has simple mathematic model and algorithm, low operational requirements on the CPU, low production costs, and high control accuracy.

To achieve the above objective, in accordance with one embodiment of the invention, there is provided a method for controlling an ECM motor to output a constant torque. The ECM motor comprises: a stator assembly, a rotor assembly, a housing assembly, and a motor controller. The motor controller comprises a power supply circuit, a microprocessor, an inverter, and a rotor position detection circuit. The power supply circuit supplies power to each circuit. The rotor position detection circuit detects a rotor position signal and inputting the rotor position signal into the microprocessor. The microprocessor controls the inverter circuit. The inverter circuit controls each coil winding of the stator assembly to be in a power-off state or a power-on state. The method comprises the following steps:

1) entering a target torque value T0 from an external device; when the motor is in a non-use state, starting the motor, and allowing the microprocessor to acquire an original output voltage value P chopped by a PWM signal; when the motor is in a running state, allowing the microprocessor to acquire a current output voltage value chopped by the PWM signal;

2) enabling the microprocessor to calculate a target bus current value Itad using the function Itad=F(T,P) according to the target torque value T0 and the output voltage value P chopped by the PWM signal, in which, Itad represents a target bus current, T represents a torque value output by the motor, P represents the output voltage value chopped by the PWM signal input to the inverter circuit by the microprocessor; and detecting a real-time bus current Ibus; and 3) allowing the microprocessor to compare the target bus current value Itad with the real-time bus current Ibus for conducting a closed-loop control: when the target bus current Itad is larger than the real-time bus current Ibus, increasing the output voltage value P chopped by the PWM signal; when the target bus current Itad is smaller than the real-time bus current Ibus, decreasing the output voltage value P chopped by the PWM signal; and when the target bus current Itad is equal to the real-time bus current Ibus, stopping regulating the output voltage value P chopped by the PWM signal, and allowing the ECM motor to enter a running state, and repeating step 2) for conducting a constant control state.

In a class of this embodiment, that the target bus current Itad is equal to the real-time bus current Ibus means that an error of a deviation of the real-time bus current Ibus from the target bus current Itad is within 1%.

In a class of this embodiment, the function Itad=F(T,P) in step 2) is Itad=K1+K2*T+K3*P+K4*T*P, in which, K1, K2, K3, and K4 represent coefficients, T represent the torque, and P represents the output voltage value chopped by the PWM signal.

In a class of this embodiment, the function Itad=F(T,P) relating to the torque value output by the motor and a DC bus current is established by experimental means.

Advantages according to embodiments of the invention are summarized as follows:

Experimental means are utilized to obtain the function Itad=F(T,P) relating to the torque value output by the motor and a DC bus current, and the microprocessor calculates the target bus current value Itad by using the function Itad=F(T,P) according to the target torque value T0. The microprocessor compares the target bus current value Itad with the real-time bus current Ibus for conducting a closed-loop control: when the target bus current Itad is larger than the real-time bus current Ibus, increase a duty cycle P of the PWM signal input into the inverter from the microprocessor; when the target bus current Itad is smaller than the real-time bus current Ibus, decrease the duty cycle P of the PWM signal input into the inverter from the microprocessor; and when the target bus current Itad is equal to the real-time bus current Ibus, stop regulating the duty cycle P of the PWM signal input into the inverter from the microprocessor. Thus, the number of control variables is decreased, the mathematical model is simple, and microprocessors of CPU or MCU having low arithmetic capability are applicable, thereby largely decreasing production costs. Meanwhile, by using the closed-loop control and the full measurements of the experimental means, the accuracy of the control is effectively ensured.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a method for controlling an ECM motor to output a constant torque are described below. It should be noted that the following examples are intended to describe and not to limit the invention.

Figure 1:
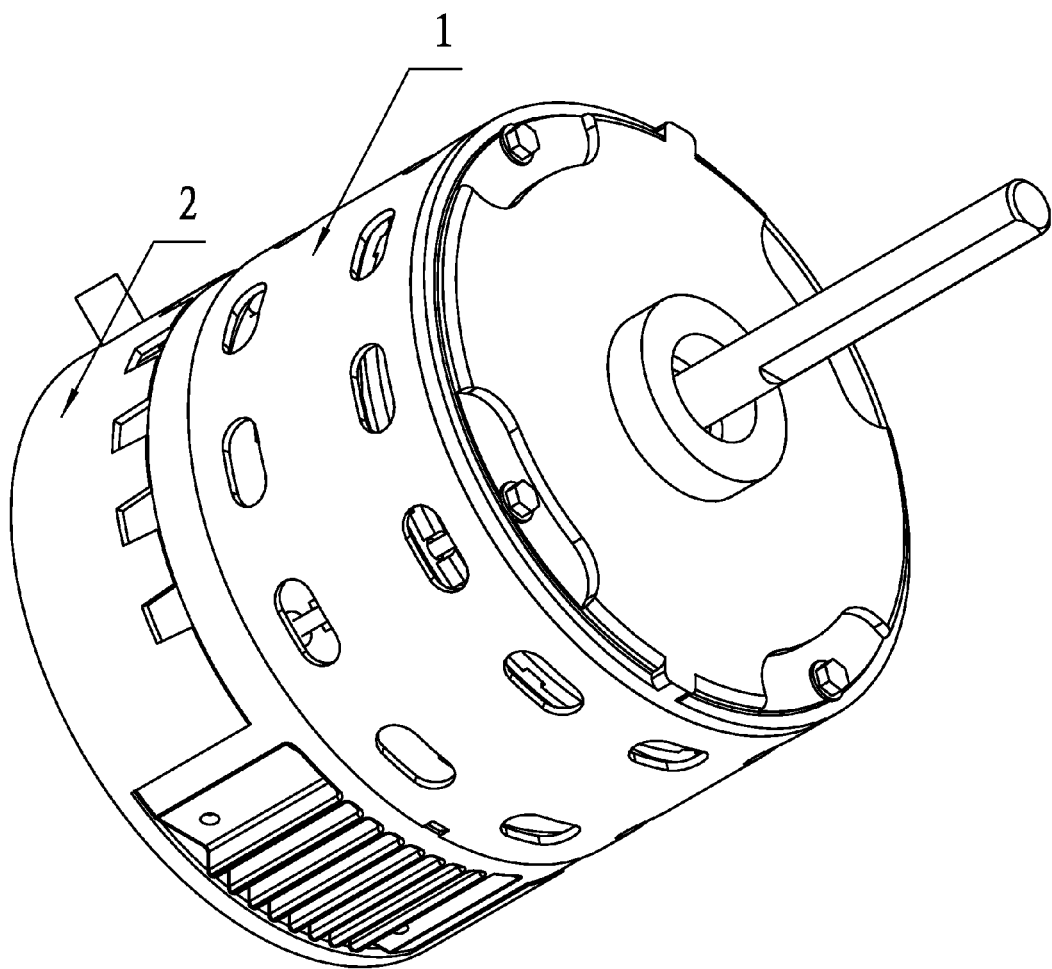
FIG. 1 is a stereogram of an ECM motor in accordance with one embodiment of the invention.
Figure 2:
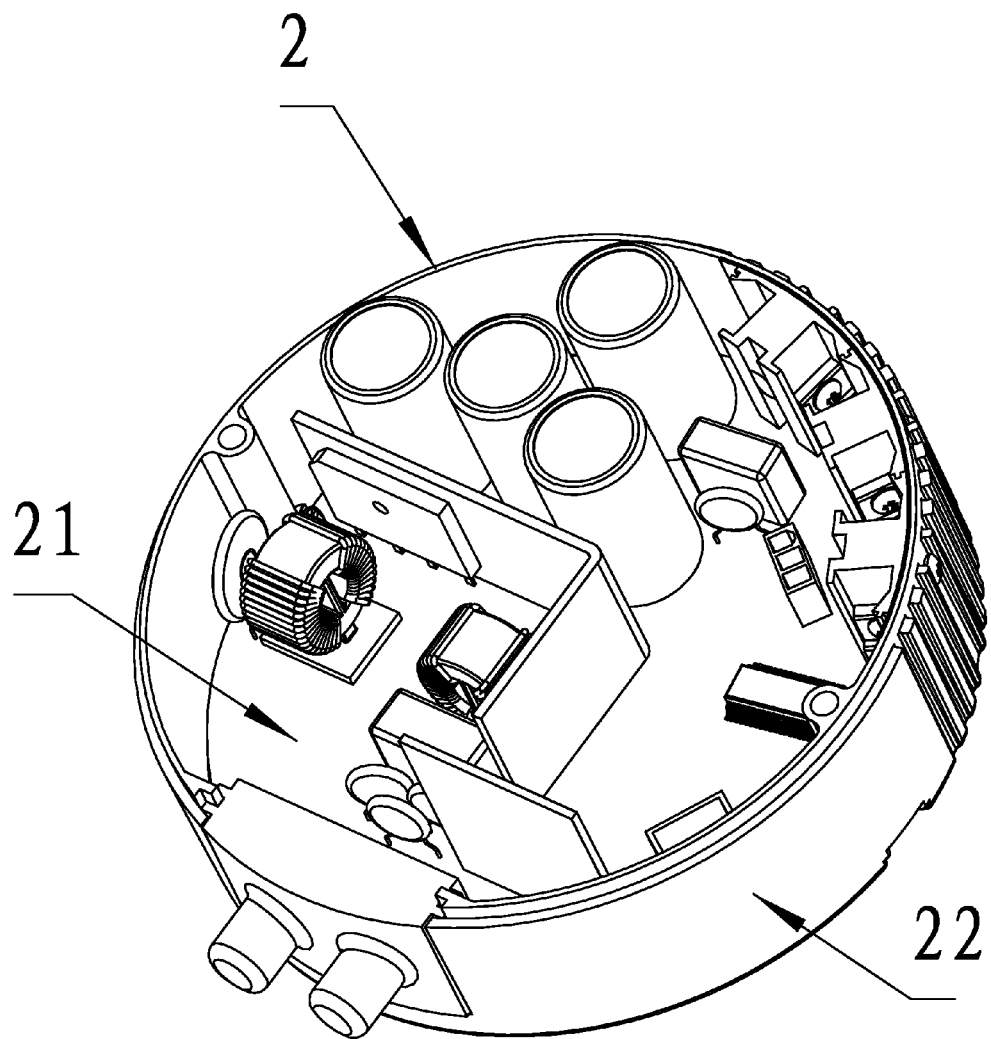
FIG. 2 is a stereogram of a motor controller of an ECM motor in accordance with one embodiment of the invention.
Figure 3:
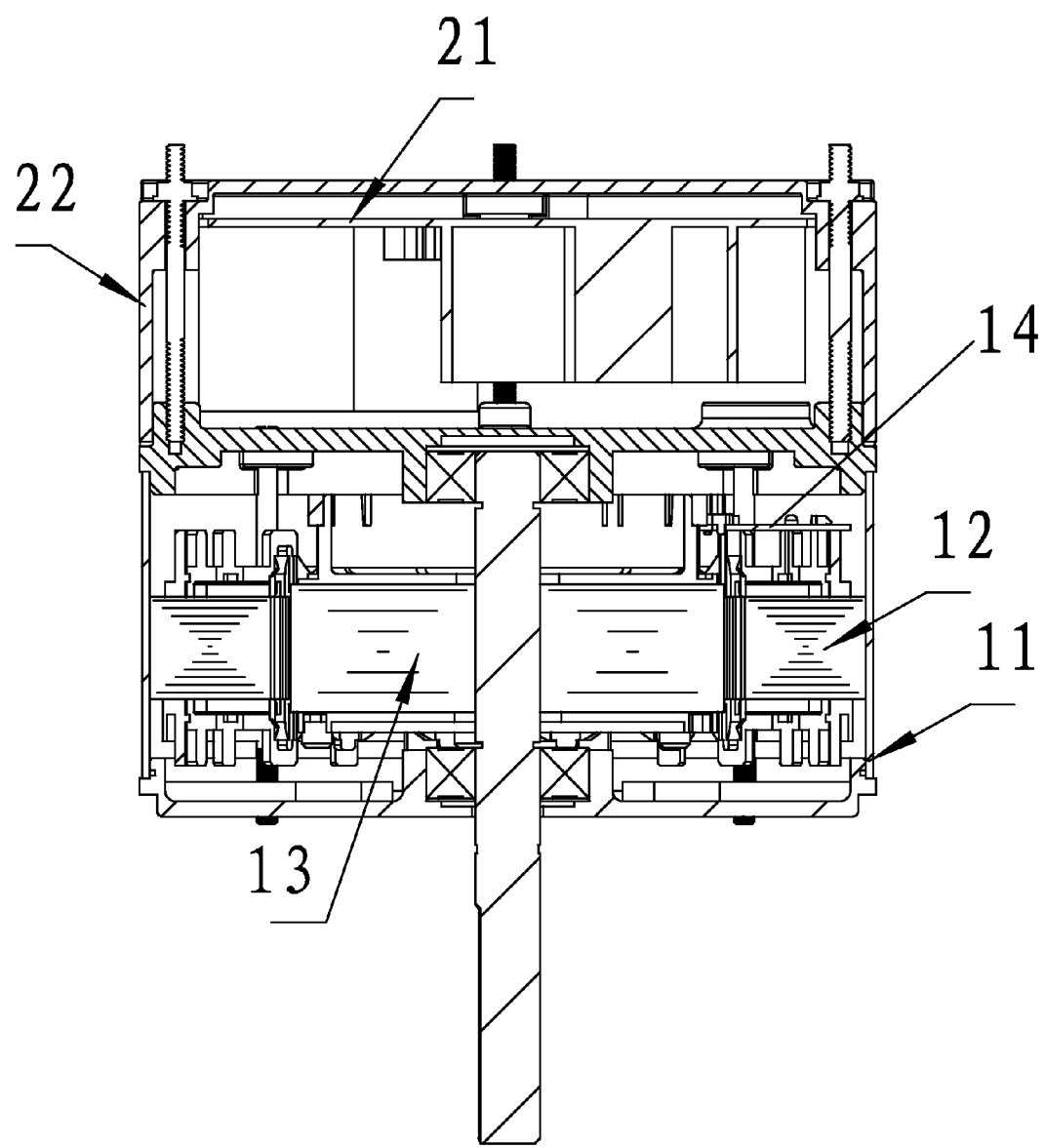
FIG. 3 is a sectional view of an ECM motor in accordance with one embodiment of the invention.

As shown in FIGS. 1-3, an ECM motor generally comprises a motor controller 2 and a motor body 1. The motor body 1 comprises a stator assembly 12, a rotor assembly 13, and a housing assembly 11. The stator assembly 13 is mounted on the housing assembly 11. The motor body 1 is provided with a hall sensor 14 for detecting a rotor position. The rotor assembly 13 is nested within or outside the stator assembly 12. The motor controller 2 comprises a control box 22 and a control board 21 disposed in the control box 22. The control board 21 generally comprises: a power supply circuit, a microprocessor, a bus current detection circuit, an inverter circuit, and a rotor position detection circuit 14 (the hall sensor). The power supply circuit supplies power to each circuit. The rotor position detection circuit detects a signal of the rotor position and sends the signal of the rotor position to the microprocessor. The bus current detection circuit detects a bus current to the microprocessor, the microprocessor controls the inverter circuit, and the inverter circuit further controls a power-off or power-on state of each coil winding of the stator assembly 12.

Figure 4:
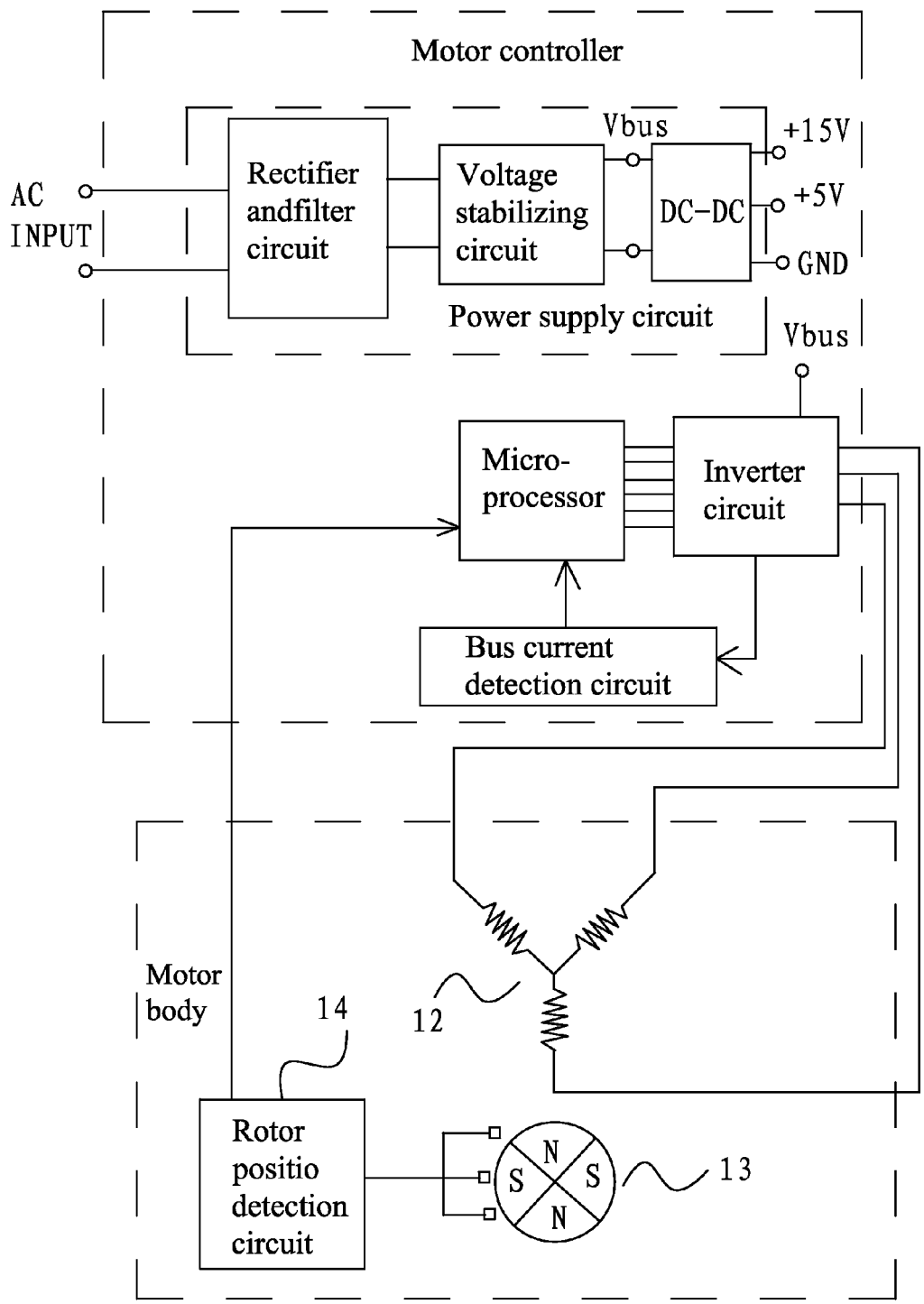
FIG. 4 is a circuit block diagram of a motor controller of an ECM motor.
Figure 5:
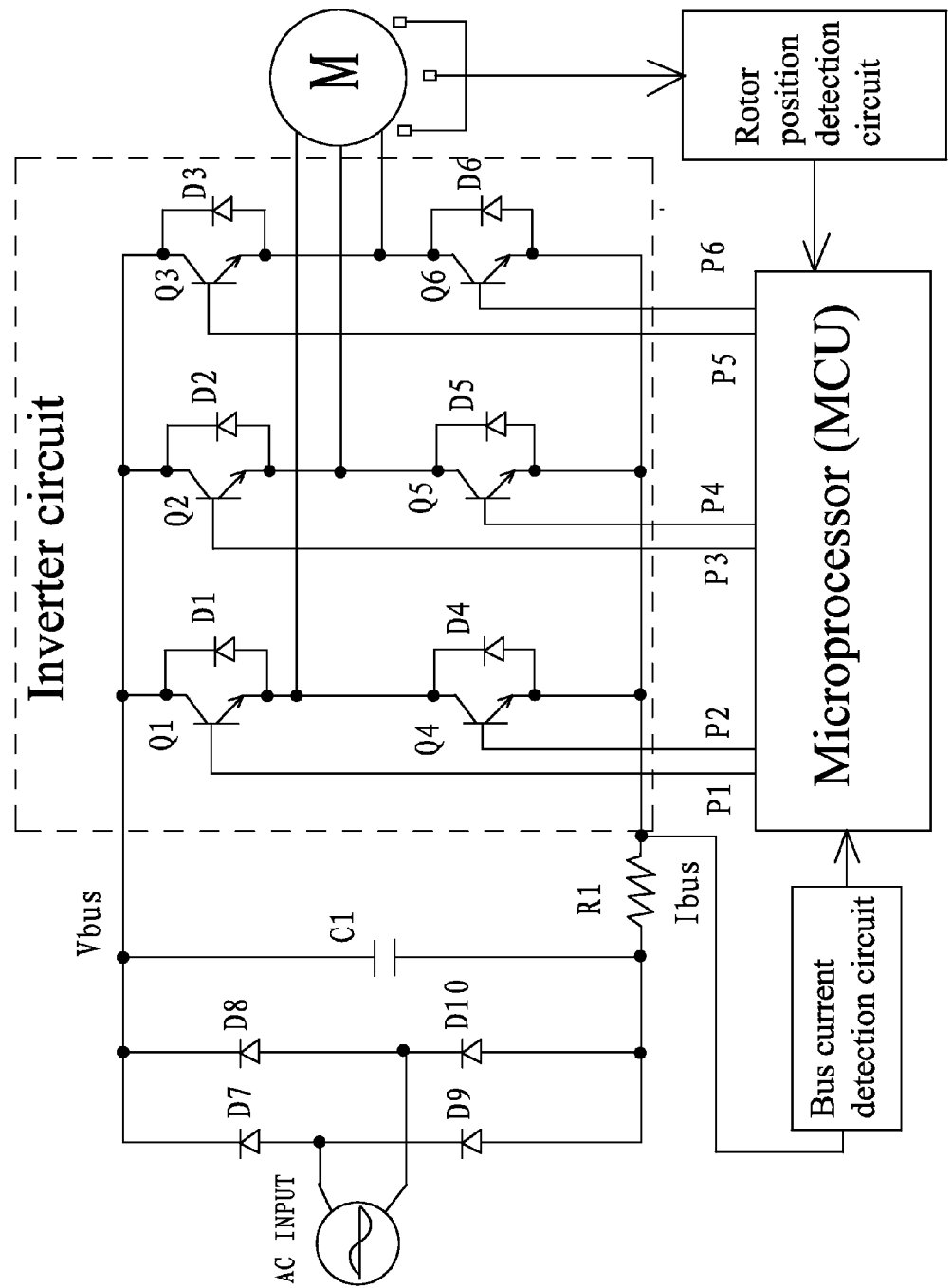
FIG. 5 is a circuit diagram of FIG. 4.

As shown in FIGS. 4-5, assuming that the ECM motor is a three-phase brushless DC permanent magnet synchronous motor, the rotor position detection circuit 14 generally comprises three hall sensors that respectively detect a rotor position in a 360° of electric angle cycle, the energization state of each coil winding of the stator assembly 12 changes when the rotator rotates for every 120° of the electric angle cycle, thereby forming a three-phase six-step control mode. The AC input passes through a full-wave rectifying circuit formed by diodes D7, D8, D9, and D10, and outputs a DC bus voltage Vbus at one end of a capacitance C1. The DC bus voltage Vbus is related to the voltage of the AC input, and once the voltage of the AC input is determined, the bus voltage Vbus is constant. A line voltage P of the three-phase winding is an output voltage of a PWM chopper, P=Vbus*w, in which, w represents a duty cycle of a PWM signal input into the inverter circuit from the microprocessor, and the DC bus current Ibus varies along with the change of the line voltage P. The inverter circuit comprises electric switching tubes Q1, Q2, Q3, Q4, Q5, and Q6. Control ends of the electric switching tubes Q1, Q2, Q3, Q4, Q5, and Q6 are respectively controlled by six lines of PWM signals (P1, P2, P3, P4, P5, and P6) output by the microprocessor. The inverter circuit is also connected to a resistance R1 for detecting the bus current Ibus, and a circuit for detecting the bus current converts the bus current Ibus detected by the resistance R1 and transmits the converted bus current Ibus to the microprocessor.

Figure 6:
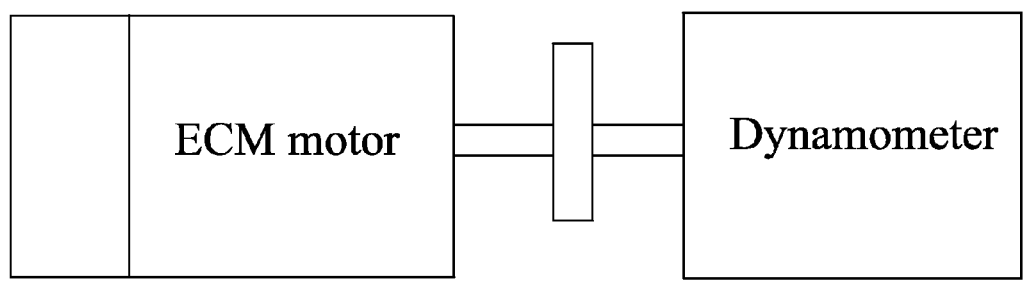
FIG. 6 is a control flow graph of a method for controlling an ECM motor to output a constant torque in accordance with one embodiment of the invention.
Figure 7:
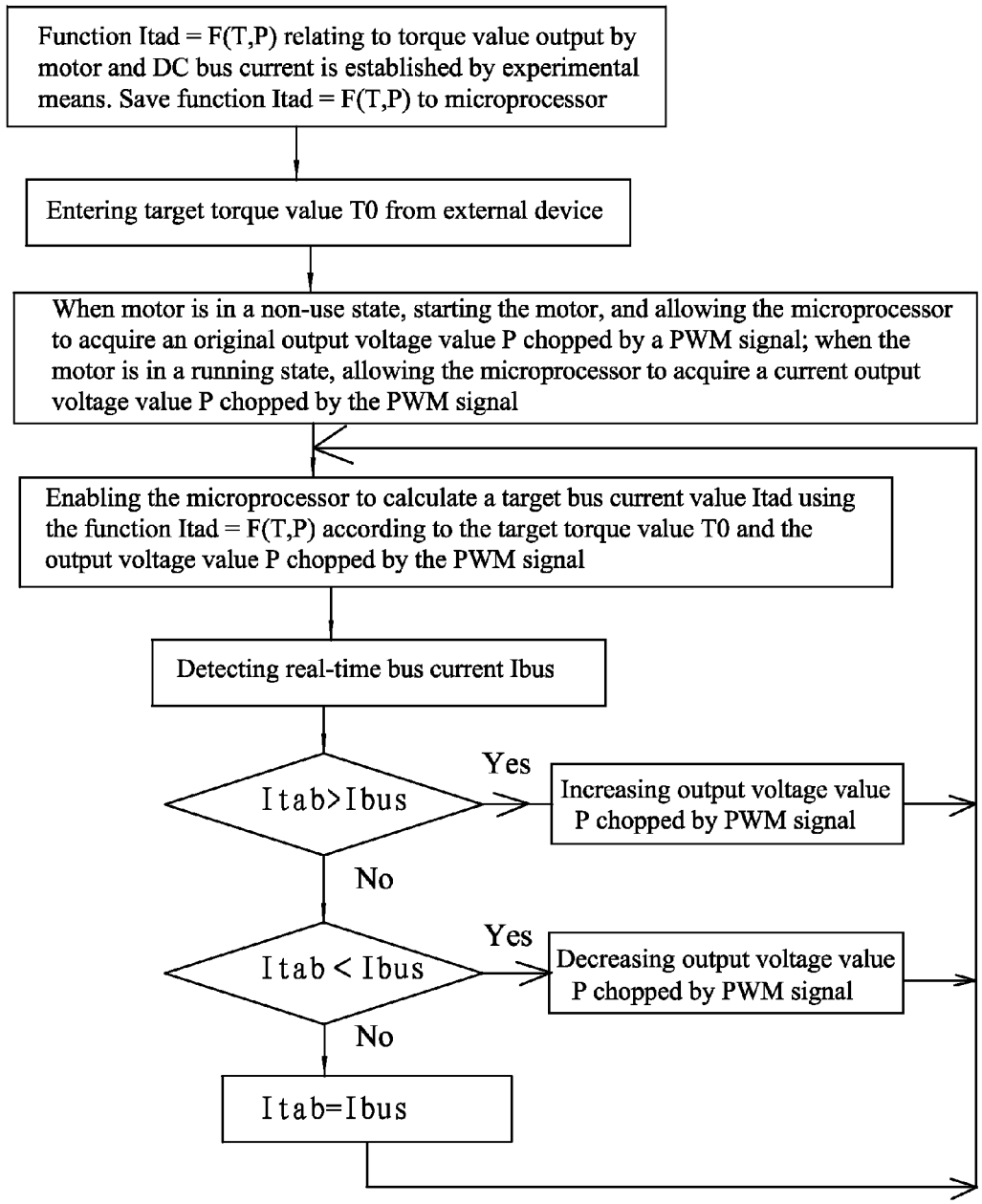
FIG. 7 is a connection diagram of an ECM motor and a dynamometer in accordance with one embodiment of the invention.

As shown in FIG. 6-7, a method for controlling an ECM motor to output a constant torque is provided. The ECM motor comprises: the stator assembly, the rotor assembly, the housing assembly, and the motor controller. The motor controller comprises the power supply circuit, the microprocessor, the inverter, and the rotor position detection circuit. The power supply circuit supplies power to each circuit. The rotor position detection circuit detects the rotor position signal and inputting the rotor position signal into the microprocessor. The microprocessor controls the inverter circuit. The inverter circuit controls each coil winding of the stator assembly to be in the power-off state or the power-on state. The method comprises the following steps:

1) entering a target torque value T0 from an external device; when the motor is in a non-use state, starting the motor, and allowing the microprocessor to acquire an original output voltage value P chopped by a PWM signal; when the motor is in a running state, allowing the microprocessor to acquire a current output voltage value chopped by the PWM signal;

2) enabling the microprocessor to calculate a target bus current value Itad using the function Itad=F(T,P) according to the target torque value T0 and the output voltage value P chopped by the PWM signal, in which, Itad represents a target bus current, T represents a torque value output by the motor, P represents the output voltage value chopped by the PWM signal input to the inverter circuit by the microprocessor; and detecting a real-time bus current Ibus; and 3) allowing the microprocessor to compare the target bus current value Itad with the real-time bus current Ibus for conducting a closed-loop control: when the target bus current Itad is larger than the real-time bus current Ibus, increasing the output voltage value P chopped by the PWM signal; when the target bus current Itad is smaller than the real-time bus current Ibus, decreasing the output voltage value P chopped by the PWM signal; and when the target bus current Itad is equal to the real-time bus current Ibus, stopping regulating the output voltage value P chopped by the PWM signal, and allowing the ECM motor to enter a running state, and repeating step 2) for conducting a constant control state.

When the target bus current Itad is equal to the real-time bus current Ibus, it refers that an error of a deviation of the real-time bus current Ibus from the target bus current Itad is within 1%.

The function Itad=F(T,P) in step 2) is Itad=K1+K2*T+K3*P+K4*T*P, in which, K1, K2, K3, and K4 represent coefficients, T represent the torque, and P represents the output voltage value chopped by the PWM signal.

The function Itad=F(T,P) relating to the torque value output by the motor and a DC bus current is established by experimental means.

As shown in FIG. 7, a certain type of ECM motor is selected, and in an open-loop mode, a dynamometer is used to test the DC bus currents of the ECM motor in conditions of different output voltages chopped by the PWM signal and different torques, as shown in Table 1.

TABLE 1

DC bus current Itad in conditions of different output voltages chopped by the PWM signal and different torques

| Testing point | Output voltage value P chopped by a PWM signal in an open loop mode of a controller | Output torque T loaded by a dynamometer | Detected DC bus current Itad output by a controller |
|---|---|---|---|
| 1 | 95%*Vbus | 0.5 Nm | 25 |
| 2 | 90%*Vbus | 3.0 Nm | 38 |
| 3 | 85%*Vbus | 1.5 Nm | 52 |
| 4 | 80%*Vbus | 5.0 Nm | 65 |
| 5 | 75%*Vbus | 2.5 Nm | 78 |
| 6 | 70%*Vbus | 3.0 Nm | 88 |
| 7 | 65%*Vbus | 4.0 Nm | 96 |

TABLE 1-continued

DC bus current Itad in conditions of different output voltages chopped by the PWM signal and different torques

| Testing point | Output voltage value P chopped by a PWM signal in an open loop mode of a controller | Output torque T loaded by a dynamometer | Detected DC bus current Itad output by a controller |
|---|---|---|---|
| 8  | 60%*Vbus | 0.5 Nm | 117 |
| 9  | 55%*Vbus | 1.0 Nm | 130 |
| 10 | 50%*Vbus | 6.0 Nm | 144 |
| 11 | 45%*Vbus | 2.0 Nm | 158 |
| 12 | 40%*Vbus | 2.5 Nm | 171 |
| 13 | 88%*Vbus | 3.0 Nm | 185 |
| 14 | 78%*Vbus | 5.0 Nm | 200 |
| 15 | 68%*Vbus | 4.5 Nm | 35  |
| 16 | 35%*Vbus | 0.5 Nm | 50  |
| 17 | 30%*Vbus | 1.0 Nm | 74  |
| 18 | 50%*Vbus | 7.0 Nm | 89  |
| 19 | 25%*Vbus | 2.0 Nm | 104 |
| 20 | 20%*Vbus | 4.0 Nm | 119 |
| 21 | 15%*Vbus | 3.0 Nm | 136 |

Because the DC bus current is only related to the output voltage P chopped by the PWM signal and the output torque T of the motor, a two-variable linear equation Itad=K1+K2*T+K3*P+K4*T*P is established. Four testing points are optionally selected from Table 1, the DC bus current Itad, the output torque T loaded by the dynamometer, and the output voltage value P chopped by the PWM signal are respectively placed in the function Itad=K1+K2*T+K3*P+K4*T*P to obtain four sets of equations, and a set of coefficients K1, K2, K3, and K4 are calculated. Another four different testing points are selected, the DC bus current Itad, the output torque T loaded by the dynamometer, and the output voltage value P chopped by the PWM signal are respectively placed in the function Itad=K1+K2*T+K3*P+K4*T*P to obtain another four sets of equations, and another set of coefficients K1, K2, K3, and K4 are calculated. Thus, a plurality of sets of coefficients K1, K2, K3, and K4 are calculated, and the function Itad=F(T,P) is obtained by optimization.

The constant torque control is conducted by the microprocessor by programming. The target torque T0 is input from the external device. When the motor is in the non-use state, the motor is started, and the microprocessor acquires the original voltage value P chopped by the PWM signal. When the motor is in the running state, the microprocessor acquires the current output voltage value P chopped by the PWM signal. The microprocessor calculates the target bus current value Itad using the function Itad=F(T,P) according to the target torque value T0 and the output voltage value P chopped by the PWM signal, and the real-time bus current Ibus is detected. The microprocessor compares the target bus current value Itad and the real-time bus current value Ibus according to the real-time bus current Ibus to correspondingly regulate the output voltage value P chopped by the PWM signal for conducting the closed-loop control.

In the open loop mode, DC bus current values of the ECM motor are tested by the dynamometer in conditions of different duty cycles P of the PWM signal and different torque values to form N sets of testing data. The more data are tested, which means the more testing points are, the higher accuracy of the function Itad=F(T,P) is, and the number and the range of the testing points are selected according to the control accuracy.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for controlling an ECM motor to output a constant torque, the ECM motor comprising:
   a stator assembly, a rotor assembly, a housing assembly, and a motor controller;
   the motor controller comprising: a power supply circuit, a microprocessor, an inverter, and a rotor position detection circuit;
   the power supply circuit supplying power to each circuit;
   the rotor position detection circuit detecting a rotor position signal and inputting the rotor position signal into the microprocessor;
   the microprocessor controlling the inverter circuit; and
   the inverter circuit controlling each coil winding of the stator assembly to be in a power-off state or a power-on state;
   the method comprising the following steps:
   1) entering a target torque value T0 from an external device; when the motor is in a non-use state, starting the motor, and allowing the microprocessor to acquire an original output voltage value P chopped by a PWM signal; when the motor is in a running state, allowing the microprocessor to acquire a current output voltage value P chopped by the PWM signal;
   2) enabling the microprocessor to calculate a target bus current value Itad using the function Itad=F(T,P) according to the target torque value T0 and the output voltage value P chopped by the PWM signal, in which, Itad represents a target bus current, T represents a torque value output by the motor, P represents the output voltage value chopped by the PWM signal input to the inverter circuit by the microprocessor; and detecting a real-time bus current Ibus; and
   3) allowing the microprocessor to compare the target bus current value Itad with the real-time bus current Ibus for conducting a closed-loop control: when the target bus current Itad is larger than the real-time bus current Ibus, increasing the output voltage value P chopped by the PWM signal; when the target bus current Itad is smaller than the real-time bus current Ibus, decreasing the output voltage value P chopped by the PWM signal; and when the target bus current Itad is equal to the real-time bus current Ibus, stopping regulating the output voltage value P chopped by the PWM signal, and allowing the ECM motor to enter a running state, and repeating step 2) for conducting a constant control state.

2. The method of claim 1, wherein that the target bus current Itad is equal to the real-time bus current Ibus means that an error of a deviation of the real-time bus current Ibus from the target bus current Itad is within 1%.

3. The method of claim 2, wherein the function Itad=F(T,P) in step 2) is Itad=K1+K2*T+K3*P+K4*T*P, in which, K1, K2, K3, and K4 represent coefficients, T represent the torque, and P represents the output voltage value chopped by the PWM signal.

4. The method of claim 2, wherein the function Itad=F(T,P) relating to the torque value output by the motor and a DC bus current is established by experimental means.

* * * * *